United States Patent
Bian

(10) Patent No.: US 8,614,287 B2
(45) Date of Patent: Dec. 24, 2013

(54) METHOD FOR PREPARING POLYTRIMETHYLENE TEREPHTHALATE WITH SUSTAINED-RELEASE CRYSTALLINITY

(75) Inventor: Shuchang Bian, Wujiang (CN)

(73) Assignee: Jiangsu Zhonglu Technology Development Co., Ltd., Wujiang, Jiangsu (CN)

( * ) Notice: Subject to any disclaimer, the term of this patent is extended or adjusted under 35 U.S.C. 154(b) by 0 days.

(21) Appl. No.: 13/579,935

(22) PCT Filed: Feb. 23, 2011

(86) PCT No.: PCT/CN2011/071211
§ 371 (c)(1),
(2), (4) Date: Aug. 19, 2012

(87) PCT Pub. No.: WO2011/131056
PCT Pub. Date: Oct. 27, 2011

(65) Prior Publication Data
US 2013/0018165 A1  Jan. 17, 2013

(30) Foreign Application Priority Data
Apr. 22, 2010  (CN) .......................... 2010 1 0155885

(51) Int. Cl.
*C08G 63/02*  (2006.01)
*C08G 64/02*  (2006.01)

(52) U.S. Cl.
USPC ......................................... 528/272; 528/271

(58) Field of Classification Search
USPC ................................. 528/271, 272
See application file for complete search history.

(56) References Cited

U.S. PATENT DOCUMENTS 7,902,264 B2 *  3/2011  Determan et al. ........... 521/48.5

FOREIGN PATENT DOCUMENTS

| CN | 101130603 A | 2/2008 |
| CN | 101463123 A | 6/2009 |
| CN | 101817917 A | 9/2010 |

OTHER PUBLICATIONS

Shell Chem LP, Poly(trimethylene terephthalate)/poly(trimethylene isophthalate) copolymers, Research Disclosure, 2003, 47(6), pp. 748-749, Paragraph 2.

* cited by examiner

*Primary Examiner* — Terressa Boykin
(74) *Attorney, Agent, or Firm* — Stites & Harbison PLLC; Cong Ding

(57) ABSTRACT

A method is disclosed herein for the preparation of polytrimethylene terephthalate with sustained-release crystallinity. The method reduces crystallization rate and crystallinity-saturation ratio of polytrimethylene terephthalate during spinning, through addition of a third monomer during the esterification reaction step. The third monomer acts as copolymerization component generating intermolecular steric hindrance; the identity of which selects from one or more as combinations of the following: trimellitic anhydride, non-para aromatic dicarboxylic acid, $C_4$-$C_{10}$ aliphatic dicarboxylic acid having branched chains or naphthenic group and $C_3$-$C_{10}$ aliphatic dihydric alcohol having branched chains or naphthenic group, the molar ratio of carboxyl to hydroxyl is 1:1.16~1.85, with the third monomer constituting 0.5~6.5% of the total weight of the beginning raw materials.

13 Claims, No Drawings

METHOD FOR PREPARING POLYTRIMETHYLENE TEREPHTHALATE WITH SUSTAINED-RELEASE CRYSTALLINITY

This application is a §371 National State Application of PCT/CN2011/071211 filed Feb. 23, 2011 which claims priority to CN 201010155885.4 filed Apr. 22, 2010, which was issued on May 2, 2012 as patent number CN101817917.

FIELD OF THE INVENTION

The present invention relates to a method for preparing polyester, especially a method for preparing polytrimethylene terephthalate with sustained-release crystallinity.

BACKGROUND OF THE INVENTION

PTT polyester is a novel aromatic polyester product of organic polymer which together with PET and PBT belongs to the same polymer series. It is prepared through esterification and polycondensation using refined terephthalic acid and 1,3-propylene glycol as the beginning raw material.

Successful development of PTT has further enriched chemical fiber products series. Firstly, distinct from PET polyester which is almost linear in macromolecular conformation, molecular conformation of PTT polymer is spiral, which will allow PTT fiber to be highly "puffed" and endow its fiber with good elasticity; secondly, PTT polyester has a lower glass-transition temperature and thus apt to take low temperature phase transition, which can effectively eliminate influence on fabric by external stress, and allow its fiber and textile to be dyed at a lower temperature with good dyeing properties of disperse dye; thirdly, the Young's modulus of PTT fiber is lower. Its textile shows very soft hand feel and good bulkiness. Its fabrics possess good elastic recovery function, and thus called "Memory Fiber".

Because of above advantages, PTT polyester and its fiber are widely and fast popularized in chemical fiber field. Up to now, the following two aspects are most widely used in the market: In one aspect, parallel composite elastic fiber that has elastic function similar to polyurethane fiber and obtains very good effects with its textile having very good elastic recovery and bulky function when used in fabric substituting for polyurethane fiber is spanned making use of the different shrink function of the two composition PTT and PET; In another aspect, conjugate spinning or combing with other fibers is conducted making use of the lower glass temperature and the easiness to take phase transition upon friction at normal temperature owned by its fiber, so that the flatness variation of the fabric caused by outer force will be eliminated king the fabric easier to take care, producing effect of "one touch smooth", and fabricating so called "Memory Fabric".

Over the years, people have done a lot beneficial modification to conventional polyester PET, so that modified terylene gain a lot excellent performance and thus be widely used. Great progress has been seen in the diversity and comfort aspect. Seen from applicability aspect, PET polyester fiber among all types of human synthetic fibers is most suitable for human need and also a most widely used polyester fiber at present. Although PTT fiber possesses its unique advantages, there are still certain defects in some performance aspects. Therefore, besides to enlarge the application of conventional PTT fiber, modification and differentiation of PTT polyester and its fiber must be done cooperating with development of modified PET polyester fiber in order to better use features of PTT fiber.

PTT polyester has unique molecular structure with molecules being able to easily approach to each other. Therefore, PTT polyester possesses crystallization property similar to Nylon 6. Its crystallization speed during spinning is fast and crystallization degree is high. Minor variation of spinning condition can change inner structure of PTT fiber, leading to different fiber uniformity which will bring great difficulty to adjustment of spinning process. In addition, in the prior art, spinning of PTT polyester is generally carried out at relatively low temperature in order to prevent degradation of melt, so that color bar or chromatic difference is formed due to insufficient crystallization of fiber during winding and stretching process. Although the fabric thus obtained has good hand feel and quality, phenomena that the fiber re-crystallizes under tension when stretched by outer force exist during starching, weaving, printing and dyeing process and even for ready-made clothes. The fabric is apt to form chromatic difference and color bar during weaving, printing and dyeing process, and for ready-made clothes lead to scratch, white bar, forming mechanical damage that are unrecoverable.

In view of above problems, the present invention adopts a brand new process and formula, so as to have the sustained-release crystallinity function of conventional PTT polyester modified and widen shaping window effectively. It can improve the use properties of PTT polyester fiber greatly and thus enlarges the application scope of PIT fiber.

SUMMARY OF THE INVENTION it is an object of the present invention to provide a method for preparing polytrimethylene terephthalate with sustained-release crystallinity.

In order to accomplish above object, the present invention adopt the following technical scheme:

A method for preparing polytrimethylene terephthalate with Sustained-release Crystallinity, comprising following steps:

(1). Esterification reaction: adding beginning raw materials into a reaction kettle and adding an esterification catalyst to carry out esterification reaction at 220° C.-260° C. and under pressure of 0.05~0.30 MPa, and completing the reaction when there being no water produced from esterifiction, wherein, the beginning raw materials consisting of 1,3-propylene glycol, terephtalic acid and a third monomer, the third monomer being copolymerizing composition that can produce steric hindrance, which being elected from the group consisting of trimellitic anhydride, non-para aromatic dicarboxylic acid, $C_4$-$C_{10}$ aliphatic dicarboxylic acid having branched chains or naphthenic group and $C_5$-$C_{10}$ aliphatic dihydric alcohol having branched chains or naphthenic group, amount of the 1,3-propylene glycol, terephtalic acid and third monomer being such used in a molar ratio of carboxyl to hydroxyl being 1:1.16~1.85, and the amount of the third monomer used being 0.5%~6.5% of the total weight of the beginning raw materials;

(2). Polymerization reaction: adding polymerization catalyst into the reaction system after step (1) and carrying out the polymerization reaction at 240° C.~280° C. to get the polytrimethylene terephthalate having Sustained-release Crystallinity.

According to the present invention, the sustained-release crystallinity means that the crystallization speed of PTT polyester during spinning decreases. The beginning raw materials are reactive raw materials that take part in esterification reaction. The non-para aromatic dicarboxylic acid are aromatic dicarboxylic acid that are not para substituted, which include but are not limited to isophthalic acid, 5-methyl-isophthalic acid, isophthalic acid-5-sodium sulfonate, phthalic acid or its anhydride and 2,6-naphthalenedicarboxylic acid. The aliphatic dicarboxylic acid includes but are not limited to 1,4-hexahydroterephthalic acid or 2,2-dimethylmalonic acid. The aliphatic dihydric alcohol includes but are not limited to 1,2-propylene glycol, 1,2-butylene glycol, 2,3-butylene glycol, neopentyl glycol and 1,4-cyclohexanedimethanol.

Preferably, the amount of the third monomer used is 1%~4.8% of the total weight of the beginning raw materials.

According to one aspect of the present invention, the third monomer a combination of the non-para aromatic dicarboxylic acid and the aliphatic dihydric alcohol. Preferably, the third monomer is a mixture of isophthalic acid and 1,4-cyclohexanedimethanol.

According to the present invention, process conditions of esterification reaction in step (1) and the polymerization reaction in step (2) are identical with that of the traditional method for preparing PTT polyester, wherein, esterification catalyst used in step (1) may be selected from the group consisting of titanate, $TiO_2/SiO_2$, catalyst of organic tin series and zinc acetate. The polymerization catalyst used in step (2) may be catalyst of titanium series such as titanate, polymerization catalyst of antimony series or their mixed catalyst. Combination use of titanate and polymerization catalyst of antimony series is preferred. In one particular embodiment, polymerization catalyst is a mixture of titanate and antimony acetate.

According to another aspect of the present invention, still an additive is added into the reaction system in step (2). The additive is selected from the group consisting of heat stabilizer, thermal oxidative stabilizer and toner.

Compared with prior arts, the present invention has following advantages:

The crystallization rate and crystallinity saturation ratio of PTT fiber are considerably reduced on the premise of maintaining the original advantageous properties through addition of appropriate amount of copolymerizing composition that can produce steric hindrance by the invention, so that controlling condition for spinning process of the PTT polyester prepared by the invention is enlarged, formation of chromatic difference of the fiber is effectively reduced, and ability of the fabric to resist damages caused by outer force is improved.

Cold-crystallization peak temperature of the PTT polyester prepared by the present invention is reduced as compared with conventional PTT polyester, and cooling-crystallization peak temperature has a minor increase, thus widening spinning and shaping window effectively, making spinning and shaping more easier and overcoming the defect that spinning condition is hard to control precisely due to narrow spinning and shaping window of conventional PTT polyester.

Excellent effect is achieved by the invention from macromolecular design angle, by carrying out molecule modification and function transplantation of chain on aspects of molecular chain structure and properties of PTT macromolecule itself.

The product is endowed with property of sustained-release crystallinity. Defects in properties of PTT polyester itself are effectively improved. The product has no requirement of special manufacturing equipment. Manufacturing equipment and other process parameters are the sage with manufacturing equipment for conventional PTT, thus the invention is fit for popularization and application.

DETAILED DESCRIPTION OF THE PREFERRED EMBODIMENT

According to the present invention, the copolymerizing composition used as the third monomer may be selected from the group consisting of trimellitic anhydride, non-para aromatic dicarboxylic acid, $C_4$-$C_{10}$ aliphatic dicarboxylic acid having branched chains or naphthenic group and $C_3$-$C_{10}$ aliphatic dihydric alcohol having branched chains or naphthenic group. Wherein, due to small branch chain structure or cycle structure, aliphatic dihydric alcohol having branched chains or naphthenic group can make chain of macromolecule dislocate and drift, thus slowing down crystallization speed. Meanwhile its addition will not lead to big change of basic properties of macromolecule since its steric hindrance is not so big. Because of the rigid structure owned by themselves, trimellitic anhydride, non-para aromatic dicarboxylic acid and aliphatic dicarboxylic acid having branched chains or naphthenic group can adjust rigidness of chain of PTT macromolecule, increase steric hindrance for the chain of PTT macromolecule during curling and bending, hindering free rotatation and movement of regional scope of macromolecular chain and making it difficult for the neighboring chain segments in macromolecular configuration to approach to each other, as a result, speed of macromolecular chain entering into lattice is considerably reduced, which leads to reduction of fast crystallization rate and crystallization ratio of PTT polyester. As a preferred embodiment of the present invention, the third monomer is combination of the aliphatic dihydric alcohol and the dihydric acid, particularly preferred, combination of aliphatic dihydric alcohol and non-para aromatic dicarboxylic acid.

According to the present invention, esterification catalyst adopted by esterification reaction may be titanate, $TiO_2/SiO_2$ or complex catalyst of zinc acetate and catalyst of organic tin series. Preferably, catalyst is dissolved before its addition into the polymerization system. One of the preferable embodiments is using 1,3-propylene glycol as solvent and simultaneously using Brnsted acid like organic carboxylic acid (succinic acid were adopted by all following example) to modulate so that the catalyst dissolves forming homogeneous catalyst solution.

According to the present invention, polymerization catalyst adopted by polymerization reaction may be those frequently used in the prior art, eg. tianate, polymerization catalyst of tin series, etc. Also catalyst of more than two kinds nay be used compositely. Preferably, polymerization catalyst is also dissolved in 1,3-propylene glycol before its addition into the polymerization system.

Further, some additives are added at esterification reaction stage or into polymerization reaction system to improve characteristics of PTT polyester finally prepared and its fiber. Types of additives can be selected according to requirement of specific application of PTT. Generally, adding heat stabilizer at polymerization stage is preferred.

The present invention will be further described blow in conjunction with the embodiments. However, the invention is not limited to the following embodiments.

Example 1

A Method for Preparing PTT Polyester, which Comprised Following Steps:

(1). Esterification reaction: 18 kg refined terephthalic acid (PTA) and 8.4 kg 1,3-propylene glycol(PDO) were added into 70 L polyester experimental device, meanwhile 180 g isophthalic acid and 140 g 1,4-cyclohexanedimethanol were added, and prepared esterification catalyst solution (containing effective titanium 45 ppm, effective tin 8 ppm and 10 ppm zinc acetate) was added as well, then the temperature was elevated and pressure was increased to 0.3 MPa to carry out the esterification reaction. Esterification temperature was controlled between 220~260° C. Recovered the pressure to constant level and ended the reaction when there was no water produced from the esterification reaction.

(2). Polymerization reaction: polymerization catalyst and stabilizer were added into the reaction system after step (1) at 235° C., after blending for 20 min, the conventional polymerization was carried out with polymerization temperature controlled between 245~278° C. and acuity lower than 40 Pa. when polymerization ended, cut a chip to conduct test. Performance index of the chip is indicated in Table 1.

Example 2

A method for preparing PTT polyester, which comprised following steps:

(1). Esterification reaction: 18 kg refined terephthalic acid (PTA), 8.4 kg 1,3-propylene glycol(PDO) were added into 70 L polyester experimental device, meanwhile 360 g isophthalic acid and 50 g 1,4-cyclohexanedimethanol were added, and prepared esterification catalyst solution (containing effective titanium 45 ppm, effective tin 8 ppm and 10 ppm zinc acetate) was added as well, then the temperature was elevated and pressure was increased to 0.3 MPa to carry out the esterification reaction. Esterification temperature was controlled between 220~260° C. Recovered the pressure to constant level and ended the reaction when there was no water produced from the esterification reaction.

(2). Polymerization reaction: polymerization catalyst and stabilizer were added into the reaction system after step (1) at 235° C., after blending for 20 min, the conventional polymerization was carried out with polymerization temperature controlled between 245~278° C. and acuity lower than 40 Pa. when polymerization ended, cut a chip to conduct test. Performance index of the chip is indicated in Table 1.

Example 3

A method for preparing PIT polyester, which comprised following steps:

(1). Esterification reaction: 18 kg refined terephthalic acid (PTA), 8.4 kg 1,3-propylene glycol(PDO) were added into 70 L polyester experimental device, meanwhile 540 g isophthalic acid and 50 g 1,4-cyclohexanedimethanol were added, and prepared esterification catalyst solution (containing effective titanium 45 ppm, effective tin 8 ppm and 10 ppm zinc acetate) was added as well, then the temperature was elevated and pressure was increased to 0.3 MPa to carry out the esterification reaction. Esterification temperature was controlled between 220~260° C. Recovered the pressure to constant level and ended the reaction when there was no water produced from the esterification reaction.

(2). Polymerization reaction: polymerization catalyst and stabilizer were added into the reaction system after step(1) at 235° C., after blending for 20 min, the conventional polymerization was carried out with polymerization temperature controlled between 245~278° C. and acuity lower than 40 Pa. when polymerization ended, cut a chip to conduct test. Performance index of the chip is indicated in Table 1.

Example 4

A method for preparing PTT polyester, which comprised following steps:

(1). Esterification reaction: 18 kg refined terephthalic acid (PTA), 8.4 kg 1,3-propylene glycol(PDO) was added into 70 L polyester experimental device, meanwhile 720 g isophthalic acid and 50 g 1,4-cyclohexanedimethanol were added, and prepared esterification catalyst solution (containing effective titanium 45 ppm, effective tin 8 ppm and 10 ppm zinc acetate) was added as well, then the temperature was elevated and pressure was increased to 0.3 MPa to carry out the esterification reaction. Esterification temperature was controlled between 220~260° C. Recovered the pressure to constant level and ended the reaction when there was no water produced from the esterification reaction.

(2). Polymerization reaction: polymerization catalyst and stabilizer were added into the reaction system after step (1) at 235° C., after blending for 20 min, the conventional polymerization was carried out with polymerization temperature controlled between 245~278° C. and acuity lower than 40 Pa. when polymerization ended, cut a chip to conduct test. Performance index of the chip is indicated in Table 1.

Example 5

A method for preparing PTT polyester, which comprised following steps:

(1). Esterification reaction: 18 kg refind terephthalic acid (PTA), 8.4 kg 1,3-propylene glycol(PDO) were added into 70 L polyester experimental device, meanwhile 900 g isophthalic acid and 50 g 1,4-cyclohexanedimethanol were added, and prepared esterification catalyst solution (containing effective titanium 45 ppm, effective tin 8 ppm and 10 ppm zinc acetate) was added as well, then the temperature was elevated and pressure was increased to 0.3 MPa to carry out the esterification reaction, Esterification temperature was controlled between 220~260° C. Recovered the pressure to constant level and ended the reaction when there was no water produced from the esterification reaction.

(2). Polymerization reaction: polymerization catalyst and stabilizer were added into the reaction system after step(1) at 235° C., after blending for 20 min, the conventional polymerization was carried out with polymerization temperature controlled between 245~278° C. and acuity lower than 40 Pa. when polymerization ended, cut a chip to conduct test, Performance index of the chip is indicated in Table 1.

Example 6

A method for preparing PTT polyester, which comprised following steps:

(1). Esterification reaction: 18 kg refined terephthalic acid (PTA), 8.4 kg 1,3-propylene glycol (PDO) were added into 70 L polyester experimental device, meanwhile 360 g isophthalic acid, 50 g 1,4-cyclohexanedimethanol and 25 g 2,3-butylene glycol were added, and prepared esterification catalyst solution (containing effective titanium 45 ppm, effective tin 8 ppm and 10 ppm zinc acetate) was added as well, then the temperature was elevated and pressure was increased to 0.3 MPa to carry out the esterification reaction. Esterification temperature was controlled between 220~260° C. Recovered the pressure to constant level and ended the reaction when there was no water produced from the esterification reaction.

(2). Polymerization reaction: polymerization catalyst and stabilizer were added into the reaction system after step(1) at 235° C., after blending for 20 min, the conventional polymerization was carried out with polymerization temperature controlled between 245~278° C. and acuity lower than 40 Pa, when polymerization ended, cut a chip to conduct test. Performance index of the chip is indicated in Table 1.

Example 7

A method for preparing PTT polyester, which comprised following steps:

(1). Esterification reaction: 18 kg refind terephthalic acid (PTA), 8.4 kg 1,3-propylene glycol(PDO) were added into 70 L polyester experimental device, meanwhile 360 g isophthalic acid, 90 g 1,4-cyclohexanedimethanol and 25 g 2,3-butylene glycol were added, and prepared esterification catalyst solution (containing effective titanium 45 ppm, effective tin 8 ppm and 10 ppm zinc acetate) was added as well, then the temperature was elevated and pressure was increased to 0.3 MPa to carry out the esterification reaction. Esterification temperature was controlled between 220~260° C. Recovered the pressure to constant level and ended the reaction when there was no water produced from the esterification reaction.

(2). Polymerization reaction: polymerization catalyst and stabilizer were added into the reaction system after step (1) at 235° C., after blending for 20 min, the conventional polymerization was carried out with polymerization temperature controlled between 245~278° C. and acuity lower than 40 Pa. when polymerization ended, cut a chip to conduct test. Performance index of the chip is indicated in Table 1.

Example 8

A method for preparing PTT polyester, which comprised following steps:

(1). Esterification reaction: 18 kg refined terephthalic acid (PTA), 8.4 kg 1,3-propylene glycol(PDO) were added into 70 L polyester experimental device, meanwhile 360 g isophthalic acid, 120 g 1,4-cyclohexanedimethanol and 25 g 2,3-butylene glycol were added, and prepared esterification catalyst solution (containing effective titanium 45 ppm, effective tin 8 ppm and 10 ppm zinc acetate) was added as well, they the temperature was elevated and pressure was increased to 0.3 MPa to carry out the esterification reaction. Esterification temperature was controlled between 220~260° C. Recovered the pressure to constant level and ended the reaction when there was no water produced from the esterification reaction.

(2). Polymerization reaction: polymerization catalyst and stabilizer were added into the reaction system after step(1) at 235° C., after blending for 20 min, the conventional polymerization was carried out with polymerization temperature controlled between 245~278° C. and acuity lower than 40 Pa. when polymerization ended, cut a chip to conduct test. Performance index of the chip is indicated in Table 1.

Example 9

A method for preparing PTT polyester, which comprised following steps:

(1). Esterification reaction: 18 kg refined terephthalic acid (PTA), 8.4 kg 1,3-propylene glycol (PDO) were added into 70 L polyester experimental device, meanwhile 450 g isophthalic acid, 50 g 1,4-cyclohexanedimethanol and 25 g neopentyl glycol were added, and prepared esterification catalyst solution (containing effective titanium 45 ppm, effective tin 8 ppm and 10 ppm zinc acetate) was added as well, then the temperature was elevated and pressure was increased to 0.3 MPa to carry out the esterification reaction. Esterification temperature was controlled between 220~260° C. Recovered the pressure to constant level and ended the reaction when there was no water produced from the esterification reaction.

(2). Polymerization reaction: polymerization catalyst and stabilizer were added into the reaction system after step (1) at 235° C., after blending for 20 min, the conventional polymerization was carried out with polymerization temperature controlled between 245~278° C. and acuity lower than 40 Pa. when polymerization ended, cut a chip to conduct test. Performance index of the chip is indicated in Table 1.

Example 10

A method for preparing PTT polyester, which comprised following steps:

(1). Esterification reaction: 18 kg refined terephthalic acid (PTA) 8.4 kg 1,3-propylene glycol(PDO) were added into 70 L polyester experimental device, meanwhile 450 g isophthalic acid, 90 g 1,4-cyclohexanedimethanol and 25 g neopentyl glycol were added, and prepared esterification catalyst solution (containing effective titanium 45 ppm, effective tin 8 ppm and 10 ppm zinc acetate) was added as well, then the temperature was elevated and pressure was increased to 0.3 MPa to carry out the esterification reaction. Esterification temperature as controlled between 220~260° C. Recovered the pressure to constant level and ended the reaction when there was no water produced from the esterification reaction.

(2). Polymerization reaction: polymerization catalyst and stabilizer were added into the reaction system after step (1) at 235° C., after blending for 20 min, the conventional polymerization was carried out with polymerization temperature controlled between 245~278° C. and acuity lower than 40 Pa. when polymerization ended, cut a chip to conduct test. Performance index of the chip is indicated in Table 1.

Example 11

A method for preparing PTT polyester, which comprised following steps:

(1). Esterification reaction: 18 kg refined terephthalic acid (PTA), 8.4 kg 1,3-propylene glycol (PDO) were added into 70 L polyester experimental device, meanwhile 450 g isophthalic acid, 120 g 1,4-cyclohexanedimethanol and 25 g neopentyl glycol were added, and prepared esterification catalyst solution (containing effective titanium 45 ppm, effective tin 8 ppm and 10 ppm zinc acetate) was added as well, then the temperature was elevated and pressure was increased to 0.3 MPa to carry out the esterification reaction. Esterification temperature was controlled between 220~260° C. Recovered the pressure to constant level and ended the reaction when there was no water produced from the esterification reaction.

(2). Polymerization reaction: polymerization catalyst and stabilizer were added into the reaction system after step (1) at 235° C., after blending for 20 min, the conventional polymerization was carried out with polymerization temperature controlled between 245~278° C. and acuity lower than 40 Pa. when polymerization ended, cut a chip to conduct test, Performance index of the chip is indicated in Table 1.

Example 12

A method for preparing PTT polyester, which comprised following steps:

(1). Esterification reaction: 18 kg refined terephthalic acid (PTA), 8.4 kg 1,3-propylene glycol (PDO) were added into 70 L polyester experimental device, meanwhile 450 g isophthalic acid, 50 g 1,4-cyclohexanedimethanol and 90 g neopentyl glycol were added, and prepared esterification catalyst solution (containing effective titanium 45 ppm, effective tin 8 ppm and 10 ppm zinc acetate) was added as well, then the temperature was elevated and pressure was increased to 0.3 MPa to carry out the esterification reaction. Esterification temperature was controlled between 220~260° C. Recovered the pressure to constant level and ended the reaction when there was no water produced from the esterification reaction.

(2). Polymerization reaction: polymerization catalyst and stabilizer were added into the reaction system after step (1) at 235° C., after blending for 20 min, the conventional polymerization was carried out with polyrimerization temperature controlled between 245~278° C. and acuity lower than 40 Pa. when polymerization ended, cut a chip to conduct test. Performance index of the chip is indicated in Table 1.

Comparative Example 1

This comparative example provided a conventional conventional method for preparing PTT polyester, which comprised following steps:

(1). Esterification reaction: 18 kg PTA and 8.4 kg PDO were added into 70 L polyester experimental device, and prepared esterification catalyst solution (containing effective titanium 45 ppm, effective tin 8 ppm and 10 ppm zinc acetate) was added, then the temperature was elevated and pressure was increased to 0.3 MPa to carry out the esterification reaction. Esterification temperature was controlled between 220~260° C. Recovered the pressure to constant level and ended the reaction when there was no water produced from the esterification reaction.

(2). Polymerization reaction: polymerization catalyst and stabilizer were added into the reaction system after step (1) at 235° C., after blending for 20 min, the conventional polymerization was carried out with polymerization temperature controlled between 245~278° C. and acuity lower than 40 Pa. when polymerization ended, cut a chip to conduct test. Performance index of the chip is indicated in Table 1.

1. It shows minor decrease in melting point, which mainly due to that addition modifying additives breaks the original macromolecular structure, resulting in decrease of intermolecular binding force.

2. Decreases of glass temperature of the chips in Examples are substantially not big as compared with that of Comparative Example, mainly due to that addition of modifying additives in itself substantially does not lead to rapid decrease of the glass temperature, especially addition of 1,4-cyclohexanedimethanol can attenuate decrease of chip grass temperature effectively. However, addition of modifying composition reduces the cold-crystallization peak temperature of the chip effectively. Within effective range of addition amount of the third monomer, cold-crystallization peak temperature of copolyester has a reduction degree of nearly 10° C., which is very advantageous for spinning and shaping conditions of PTT chip, widening spinning and shaping window of PTT polyester, further lowering precision requirement for spinning device and allowing spinning condition to be set at a wider scope. Through comparative experiment, good experimental effects are achieved, which signifies that the preparing method is reasonable and has no difficulty in pelletizing.

Polyester chips of Example 1~12 and Comparative Examples 1 were processed to prepare 83.3 dtex/48 f FDY fiber according to conventional spinning process. Glass temperature, cold-crystallization peak enthalpy and melting point of oil-free thread at different spinning speed conditions during spinning process of the product were tested and compared.

TABLE 1

| Example | intrinsic viscosity (dl/g) | melting point (° C.) | content of Carboxyl end group (mg/KOH g) | Hue B value | Tg (° C.) | The agglomerate particles | cold crystallization peek temperature (° C.) | Spinning effect |
|---|---|---|---|---|---|---|---|---|
| Example 1 | 0.922 | 228 | 14.8 | 4.2 | 46.1 | Nil | 175.1 | good |
| Example 2 | 0.925 | 228 | 13.0 | 4.9 | 46.0 | Nil | 172.4 | good |
| Example 3 | 0.920 | 226 | 14.3 | 4.6 | 44.6 | Nil | 168.7 | good |
| Example 4 | 0.919 | 225 | 13.1 | 5.3 | 43.3 | Nil | 165.3 | good |
| Example 5 | 0.923 | 223 | 15.1 | 5.0 | 42.9 | Nil | 162.5 | good |
| Example 6 | 0.920 | 228 | 13.8 | 4.7 | 45.8 | Nil | 170.8 | good |
| Example 7 | 0.913 | 227 | 14.4 | 4.9 | 45.6 | Nil | 170.1 | good |
| Example 8 | 0.921 | 226 | 13.5 | 4.0 | 45.0 | Nil | 169.6 | good |
| Example 9 | 0.916 | 227 | 14.3 | 5.1 | 44.6 | Nil | 168.3 | good |
| Example 10 | 0.924 | 226 | 13.3 | 5.4 | 44.2 | Nil | 168.0 | good |
| Example 11 | 0.917 | 225 | 12.8 | 4.8 | 44.0 | Nil | 167.7 | good |
| Example 12 | 0.922 | 226 | 13.5 | 5.8 | 45.2 | Nil | 167.9 | good |
| Comparative Example 1 | 0.917 | 229 | 14.9 | 4.8 | 46.3 | Nil | 178.2 | good |

Refer to Table 1, compared with PTT polyester prepared according to the conventional process, the PTT polyester prepared according to the present invention:

TABLE 2

Technical index of PTT polyester fiber at different spinning speed conditions

| | Performance index | | | | | | | | | | |
|---|---|---|---|---|---|---|---|---|---|---|---|
| | Spinning speed 2300 m/min | | | Spinning speed 2800 m/min | | | Spinning speed 3400 m/min | | | Spinning speed 4000 m/min | | |
| Example | Tg °C. | Cold-crystallization peak enthalpy | Tm °C. | Tg °C. | Cold-crystallization peak enthalpy | Tm °C. | Tg °C. | Cold-crystallization peak enthalpy | Tm °C. | Tg °C. | Cold-crystallization peak enthalpy | Tm °C. |
| Example 1 | 43.5 | 15.1 | 226.2 | 45.3 | 13.8 | 226.8 | 45.8 | 7.7 | 226.6 | 44.6 | 6.4 | 225.8 |
| Example 2 | 43.0 | 17.1 | 224.3 | 44.5 | 14.7 | 224.8 | 44.4 | 8.9 | 225.5 | 44.0 | 5.4 | 223.9 |
| Example 3 | 43.3 | 17.7 | 224.0 | 44.7 | 15.0 | 224.4 | 44.5 | 12.2 | 223.6 | 43.1 | 9.2 | 222.1 |
| Example 4 | 44.0 | 20.4 | 221.9 | 44.6 | 17.7 | 221.8 | 44.2 | 14.5 | 221.3 | 41.9 | 13.7 | 219.6 |
| Example 5 | 44.6 | 22.1 | 220.1 | 44.8 | 19.6 | 219.6 | 44.3 | 16.7 | 219.0 | 41.4 | 17.1 | 216.5 |
| Example 6 | 43.0 | 17.1 | 224.7 | 44.5 | 14.8 | 225.1 | 44.4 | 9.7 | 225.4 | 44.0 | 6.5 | 223.7 |
| Example 7 | 43.1 | 17.3 | 224.1 | 44.6 | 15.1 | 224.8 | 44.3 | 10.8 | 225.5 | 43.9 | 7.0 | 223.4 |
| Example 8 | 43.2 | 17.5 | 223.9 | 44.7 | 15.4 | 223.9 | 44.5 | 11.7 | 225.1 | 43.8 | 8.8 | 223.1 |
| Example 9 | 43.1 | 17.3 | 224.0 | 44.8 | 14.8 | 224.7 | 44.4 | 11.8 | 223.9 | 43.6 | 8.4 | 222.8 |
| Example 10 | 43.4 | 17.6 | 224.5 | 44.6 | 14.9 | 224.6 | 44.6 | 12.4 | 223.7 | 42.9 | 8.9 | 222.6 |
| Example 11 | 43.7 | 18.3 | 223.6 | 44.5 | 16.7 | 223.8 | 44.0 | 13.5 | 223.3 | 42.9 | 10.7 | 222.6 |
| Example 12 | 44.3 | 19.7 | 221.7 | 44.6 | 18.2 | 221.4 | 44.2 | 15.9 | 220.6 | 41.8 | 15.2 | 219.9 |
| Comparative example 1 | 44.8 | 14.9 | 227.6 | 46.2 | 12.7 | 227.3 | 47.1 | 7.2 | 227.2 | 45.1 | 6.9 | 226.9 |

As can be seen from Table 2, cold-crystallization peak enthalpy increases noticeably along with increasing content of the third monomer composition at the same spinning speed conditions. The increase of enthalpy signifies that crystalline region and amorphous state has already been substantially fixed and that spinning tension of fiber has reduced noticeably and stability has proved noticeably. During post-processing, the crystalline region and amorphous region that are not stable enough originally do not exist anymore. Chromatic difference of fabric is noticeably reduced when dyeing. Since basic molecular structure of the fabric has already been stable, the change due to crystallization produced originally by the action of high temperature and outer force is greatly reduced.

As testified by spinning test, PTT polyester prepared by the invention has good spinning behavior and spinning stability. Compared with the Comparative Example, substantially there is no chromatic difference for the fiber and phenomenon of color bar for the fabric, and the originally common dyeing unevenness due to uneven stretching tension is effectively attenuated during post-process, thus meeting application requirement of PTT fiber for spinning various high grade fabric having excellent use effect, flat and close cloth cover and good softness.

The invention claimed is:

1. A method for preparing polytrimethylene terephthalate polymer with sustained-release crystallinity, comprising following steps of:
    (1). combining the raw materials and an esterification catalyst to carry out an esterification reaction at 220° C.-260° C. and under pressure of 0.05-0.30 MPa, and completing the reaction when there is no water produced from esterification, wherein said raw materials consists essentially of 1,3-propylene glycol, terephtalic acid and a third monomer, wherein said third monomer can produce steric hindrance in said polymer, wherein said third monomer is a combination of a non-para aromatic dicarboxylic acid and a C3-C10 aliphatic dihydric alcohol having branched chains or naphthenic group, wherein the amount of said 1,3-propylene glycol, terephtalic acid and third monomer is in a molar ratio of carboxyl to hydroxyl being 1:1.16-1.85, and the amount of said third monomer used is 0.5%-6.5% of the total weight of said raw materials; and
    (2). adding a polymerization catalyst after step (1) and carrying out a polymerization reaction at 240° C.-280° C. to yield said polytrimethylene terephthalate polymer with sustained-release crystallinity.

2. The method of claim 1, wherein the third monomer is 1%-4.8% of the total weight of the raw materials.

3. The method of claim 1, wherein the non-para aromatic dicarboxylic acid is selected from the group consisting of isophthalic acid, 5-methyl-isophthalic acid, isophthalic acid-5-sodium sulfonate, phthalic acid or its anhydride and 2,6-naphthalenedicarboxylic acid.

4. The method of claim 1, wherein the third monomer further comprising aliphatic dicarboxylic acid, wherein said aliphatic dicarboxylic acid is selected from the group consisting of 1,4-hexahydroterephthalic acid and 2,2-dimethylmalonic acid.

5. The method of claim 1, wherein the aliphatic dihydric alcohol and is selected from the group consisting of 1,2-propylene glycol, 1,2-butylene glycol, 2,3-butylene glycol, neopentyl glycol and 1,4-cyclohexanedimethanol.

6. The method of claim 1, wherein the third monomer is a mixture of isophthalic acid and 1,4-cyclohexanedimethanol.

7. The method of claim 1, wherein the esterification catalyst is selected from the group consisting of titanate, $TiO_2$/$SiO_2$, catalyst of organic tin series and zinc acetate.

8. The method of claim 1, wherein the polymerization catalyst is a mixture of titanate and antimony acetate.

9. The method of claim 1, further comprising the step of adding an additive selected from the group consisting of heat stabilizer, thermal oxidative stabilizer and toner.

10. The method of claim 1, wherein the third monomer is a $C_4$-$C_{10}$ aliphatic dicarboxylic acid having branched chains or naphthenic group.

11. The method of claim 10, wherein the third monomer is selected from the group consisting of an 1,4-hexahydroterephthalic acid and 2,2-dimethylmalonic acid.

12. A polytrimethylene terephthalate polyester product having a reduced cold-crystallization peak temperature made by the process comprising:

reacting a first monomer comprising terephthalic acid; second monomer comprising 1,3-propylene glycol and a third monomer comprising a mix of a non-para aromatic dicarboxylic acid and an aliphatic dihydric alcohol in the presence of an esterification catalyst at a temperature of between 220° C.-260° C. and under pressure of 0.05-0.30 MPa to form a first esterified product; and adding a polymerization catalyst to said esterified product at 240° C.-280° C. to yield a polytrimethylene terephthalate product having a reduced cold-crystallization peak temperature as compared to conventional polytrimethylene terephthalate polyester.

13. The product of claim 12 wherein the polytrimethylene terephthalate polyester is formed into a fiber having an increased cold-crystallization peak enthalpy as compared to a conventional polytrimethylene terephthalate polyester fiber.

* * * * *